May 7, 1929.  F. LUTZ  1,711,737
BALL CRANK
Filed Feb. 3, 1928
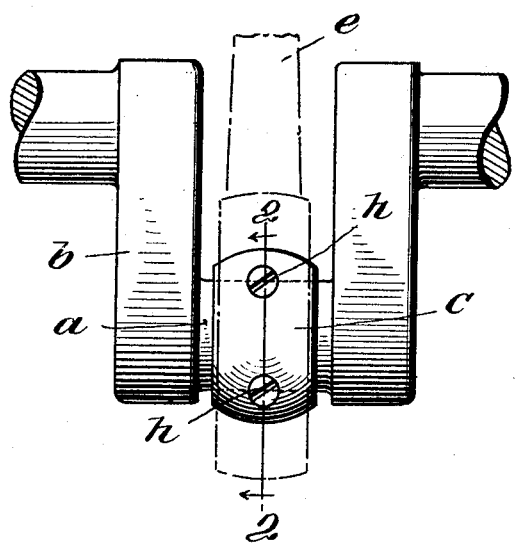
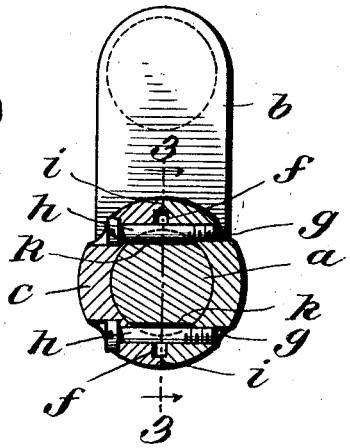
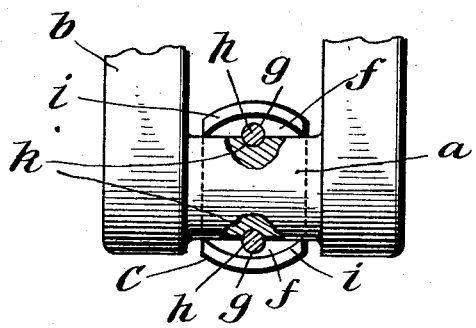
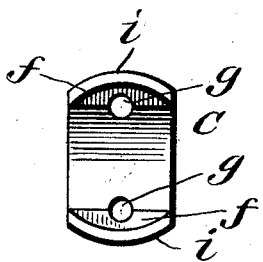
Inventor
Friedrich Lutz,
By
Attorneys.

Patented May 7, 1929.

1,711,737

UNITED STATES PATENT OFFICE.

FRIEDRICH LUTZ, OF STUTTGART, GERMANY, ASSIGNOR TO UNION SPECIAL MASCHINENFABRIK, G. M. B. H., OF STUTTGART, GERMANY.

BALL CRANK.

Application filed February 3, 1928, Serial No. 251,637, and in Germany February 21, 1927.

This invention relates to improvements in ball cranks, and more particularly to the construction of such ball cranks of replaceable parts.

It has heretofore been the usual practice to form ball crank pins with the ball heads integral with the crank pin itself. It was necessary for this to work the parts out of the solid block, and disregarding the circumstantial and difficult manufacture, there was no possibility of replacing the ball head when worn, and since this head received much more wear than the crank shaft and pin proper, such replacement was necessary when the ball head was worn, although the crank shaft and pin otherwise were well preserved and useable.

When it has been proposed to provide a separate sleeve for the ball head, it was necessary to provide some additional means of preventing a relative rotational and translational movement of the sleeve with respect to the crank pin by which it was supported.

One of the objects of this invention is to provide a ball crank construction which is easily made and which may be quickly and directly attached to a central member or pin of the crank.

A further object is to provide simple and direct means of preventing the rotation of the bearing sleeve about the crank pin and to prevent relative axial movements of these members.

Another object of this invention is to provide a ball crank of separable members including a replaceable split bearing sleeve having a spherical external form in which the split sleeve is held upon and prevented from movement relatively to the central crank pin by means located wholly within the spherical surface of the split sleeve.

With these and other objects in view, as will appear in the course of the following specification and claims, I have illustrated one form of execution of this invention in the accompanying drawings, in which:

Figure 1 is a front elevation of a crank shaft provided with a ball crank according to this invention, with a crank rod indicated in dotted lines.

Fig. 2 is a section substantially on line 2—2 of Fig. 1.

Fig. 3 is a section substantially on line 3—3 of Fig. 2, but with a part of the crank pin in elevation.

Fig. 4 is an elevation of one section of a hemispherical split sleeve section, seen from the flat side.

According to the illustrated form of this invention, the crank member is provided with a crank pin having two chordal notches at its periphery, these notches being parallel and located at diametrically opposite points of the crank pin. A bearing sleeve having a spherically formed external surface is provided with a central or axial bore hole fitted to the crank pin: this spherical sleeve is split in a central plane passing through the axis of the crank pin so that two half sections are formed, each corresponding to a hemisphere, but cut away to form end faces through which the crank pin passes. Cap screws are passed through the two sections to clamp them together and hold them firmly upon the crank pin: these cap screws being seated in the chordal grooves of a crank pin, so that relative rotational and axial translational movement of the split sleeve and of the crank pin are prevented.

In these drawings, the crank pin $a$ of the angular crank shaft $b$ is provided with a bearing sleeve comprising the two half sections $c, c$, which together are embraced by the head $d$ of a crank rod $e$, as shown in dotted lines in Fig. 1. The crank pin $a$ is provided at diametrally opposite points with chordal grooves $k$, the bottoms of these grooves extending parallel to each other. The half sections $c, c$ of the bearing sleeve are hemispherical in that their external surfaces joined together form a segment of a sphere, while the sections abut against each other at a plane passing through the center of the sphere and through the axis of the crank pin $a$.

The half sections $c, c$ of the split sleeve are provided with bore holes $g, g$ to receive the cap screws $h, h$, the heads of which respectively engage against a shoulder in one half section $c$, and the screw-threaded ends of which respectively engage in threaded portions of the bore holes $g$ of the other section $c$, so that by tightening the cap screws, the half sections are clamped firmly together, and upon the crank pin $a$. It will particularly be noted that the cap screws $h, h$ lie wholly within the circular outline of the section of Fig. 2, and hence are located wholly within the spherical outline of the split bearing sleeve, so that there is no encumbrance upon the crank pin adjacent its ends. These cap screws $h, h$ further lie in the chordal notches $k, k$ of the pin $a$, so that the cooperation of the body of the cap screw and the walls of the respective groove prevent both a relative rotational movement of the split bearing sleeve about the axis of the crank pin $a$, and also an axial translation of the sleeve with respect to the crank pin.

A preferred method of constructing the split bearing sleeve consists in preparing a blank with a central bore hole to adapt it to fit upon the crank pin $a$, and with chordal bore holes $g, g$. The metal of the blank is then cut away substantially in the axial plane along which the blank is to be cut to form the two sections, by a pair of grooves $f, f$, formed internally and extending radially outward from the bore hole which is to receive the crank pin $a$. It is preferred to have the outward or bottom portion of the respective groove arcuate about the center of the spherical shape so that a uniform thickness of metal is left in the shell between the bottom of the groove and the external surface.

When the ball blank has been thus finished with its spherical external surface, its bore holes, and its grooves, it is hardened in the usual manner. It will be noted that by the shape of the grooves, hardening is facilitated in that there is little tendency to warp during the treatment. The blank is now cut through at a plane at right angles to the axes of the bore holes $g, g$, i. e., passing through the axis of the hole which is to receive the crank pin $a$, and therefore corresponding to a plane passing through the axis of the crank pin $a$, thus forming the two hemispherical sections each having a flat surface $i$ at the periphery of the cut face, these flat surfaces being adapted to abut against each other in an axial plane of the crank pin $a$ when the split bearing sleeve is assembled about the crank pin.

In assembling such a ball crank, which is particularly adapted for use in sewing machines, although not exclusively to be employed therein, the shaft is formed, and the crank pin may be left soft, i. e., without hardening. The ball sleeve is constructed as above and is assembled upon the crank pin, and then the crank rod and strap placed in position. As in the course of time, the bearing sleeve becomes worn so that no adjustment will take up the play existing, it is only necessary to release the screws $h, h$ and remove the two ball sections and replace them by other new sections in order to rehabilitate the shaft with respect to its crank member.

It is obvious that the invention is not limited to the specific form of embodiment shown, but may be employed in many ways within the scope of the appended claims.

I claim:

1. A ball crank comprising a crank pin, a spherical bearing sleeve surrounding said pin and split axially so that the sleeve may be assembled about and removed from said pin, and means to join sections of said sleeve together, said means also cooperating with said pin to prevent movement of said sleeve upon said pin.

2. A ball crank comprising a crank pin, a spherical bearing sleeve surrounding said pin and split axially so that the sleeve may be assembled about and removed from said pin, and means to join sections of said sleeve together, said means being located wholly within the spherical surface of said sleeve, said means also cooperating with said pin within said sleeve to prevent movement of said sleeve upon said pin.

3. A ball crank comprising a crank pin having a chordal notch at its periphery, a spherical bearing sleeve surrounding said pin and split axially so that the sleeve may be assembled about and removed from said pin, and a screw passing through and connecting sections of said sleeve to hold the sleeve upon the pin, said screw also being located in said notch when the sections are assembled upon the pin, so that the sleeve is thereby prevented from moving relative to the pin.

In testimony whereof, I affix my signature.

FRIEDRICH LUTZ.